(12) United States Patent
Murofushi

(10) Patent No.: US 8,643,338 B2
(45) Date of Patent: Feb. 4, 2014

(54) POWER SUPPLY CIRCUIT USING RECHARGEABLE BATTERY

(75) Inventor: Nobuo Murofushi, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 286 days.

(21) Appl. No.: 13/224,211

(22) Filed: Sep. 1, 2011

(65) Prior Publication Data

US 2012/0062033 A1 Mar. 15, 2012

(30) Foreign Application Priority Data

Sep. 9, 2010 (JP) ................................. 2010-201518

(51) Int. Cl.
*H01M 10/46* (2006.01)
(52) U.S. Cl.
USPC .......................................... 320/134; 320/136
(58) Field of Classification Search
USPC .................... 320/107, 112, 134, 136
See application file for complete search history.

(56) References Cited

U.S. PATENT DOCUMENTS

| 7,190,148 B2 * | 3/2007 | Ooshita et al. ................ 320/134 |
| 7,226,881 B2 * | 6/2007 | Goto .................................. 501/4 |
| 7,737,662 B2 * | 6/2010 | Lu et al. ......................... 320/134 |
| 2010/0090652 A1 * | 4/2010 | Takeda et al. ................. 320/134 |
| 2010/0097033 A1 * | 4/2010 | Tange ............................. 320/116 |

FOREIGN PATENT DOCUMENTS

JP 8-331768 12/1996

* cited by examiner

*Primary Examiner* — Edward Tso
(74) *Attorney, Agent, or Firm* — Patterson & Sheridan, LLP

(57) ABSTRACT

A power supply circuit uses a rechargeable battery that if a connection switching unit changes to a circuit connected state, a current starts to be supplied from the rechargeable battery to an over-discharge protection circuit, a logic circuit, and a power supply control circuit, and if the connection switching unit changes to a circuit non-connected state during this current supply, the current supplied to the over-discharge protection circuit, the logic circuit, and the power supply control circuit is maintained, and a current supplied from the rechargeable battery to the load circuit is started by supplying the current from the power supply control circuit to the load circuit, and if a voltage of the rechargeable battery drops while the current is supplied to the load circuit, and the over-discharge protection circuit stops the current supplied from the rechargeable battery to the load circuit, the over-discharge protection circuit maintains the stopped state.

14 Claims, 3 Drawing Sheets

FIG. 3

| INPUT | | OUTPUT | | FUNCTION |
|---|---|---|---|---|
| D | CK | Q | /Q | |
| L | ↑ | L | H | - |
| H | ↑ | H | L | - |
| × | ↓ | Qn | /Qn | NO CHANGE |

POWER SUPPLY CIRCUIT USING RECHARGEABLE BATTERY

CROSS-REFERENCE TO RELATED APPLICATION

The present invention claims benefit of priority of Japanese Patent Application No. 2010-201518 filed on Sep. 9, 2010. The contents of the application is incorporated into the present application by reference.

FIELD

An embodiment of the present invention relates; to a power supply circuit using a secondary battery, i.e., a rechargeable battery.

BACKGROUND

Portable apparatuses using secondary batteries are recently widely available. So-called lithium-ion (Li-ion) batteries are widely used as the secondary batteries.

Charging characteristics of conventional secondary batteries are deteriorated once the batteries are over-discharged, and even if they are charged again, the batteries cannot be fully charged. This over-discharged state occurs if the output voltage of the secondary battery becomes less than a predetermined value. Therefore, in order to prevent over-discharged state, an over-discharge protection circuit is provided between the secondary battery and a load.

Various kinds of portable apparatuses using a power supply circuit including the secondary battery explained above use the over-discharge protection circuit to prevent over-discharge. However, even though the over-discharge protection circuit is activated, a current may continue to flow from the secondary battery. If the secondary battery is not charged for a long time in such state, the secondary battery may be in over-discharged state.

The present invention has been made in view of the above facts, and an object of the present invention is to prevent the secondary battery from keeping on discharging a current if the voltage of the secondary battery becomes less than a predetermined value.

BRIEF DESCRIPTION OF THE DRAWINGS

FIG. 3 is a figure illustrating an example of truth table for explaining operation of a D flip-flop according to the present embodiment.

DETAILED DESCRIPTION

According to an embodiment of the present invention, a power supply circuit using a rechargeable battery is provided. The power supply circuit includes an over-discharge protection circuit interposed in a current supply from a rechargeable battery to a load circuit, wherein the over-discharge protection circuit stops the current supplied from the rechargeable battery to the load circuit if the voltage of the rechargeable battery becomes less than a predetermined value, a connection switching unit connected to the rechargeable battery and connected to an input side of the over-discharge protection circuit, wherein only if the connection switch unit is manipulated, the connection switch unit is in a circuit connected state in which the current is input to the over-discharge protection circuit, a power supply control circuit connected between the load circuit and an output of the over-discharge protection circuit, wherein the power supply control circuit controls the current supplied to the load circuit, and a logic circuit connected to the connection switching unit, wherein the logic circuit controls the over-discharge protection circuit and the power supply control circuit in accordance with the manipulation of the switching unit, wherein if the connection switching unit changes to the circuit connected state, the current starts to be supplied from the rechargeable battery to the over-discharge protection circuit, the logic circuit, and the power supply control circuit, and if the connection switching unit changes to a circuit non-connected state during this current supply, the current supplied to the over-discharge protection circuit, the logic circuit, and the power supply control circuit is maintained, and a current supplied from the rechargeable battery to the load circuit is started by supplying the current from the power supply control circuit to the load circuit, and if a voltage of the rechargeable battery drops while the current is supplied to the load circuit, and the over-discharge protection circuit stops the current supplied from the rechargeable battery to the load circuit, the over-discharge protection circuit maintains the stopped state.

Hereinafter, an embodiment of the present invention will be described with reference to the drawings.

Figure 1:
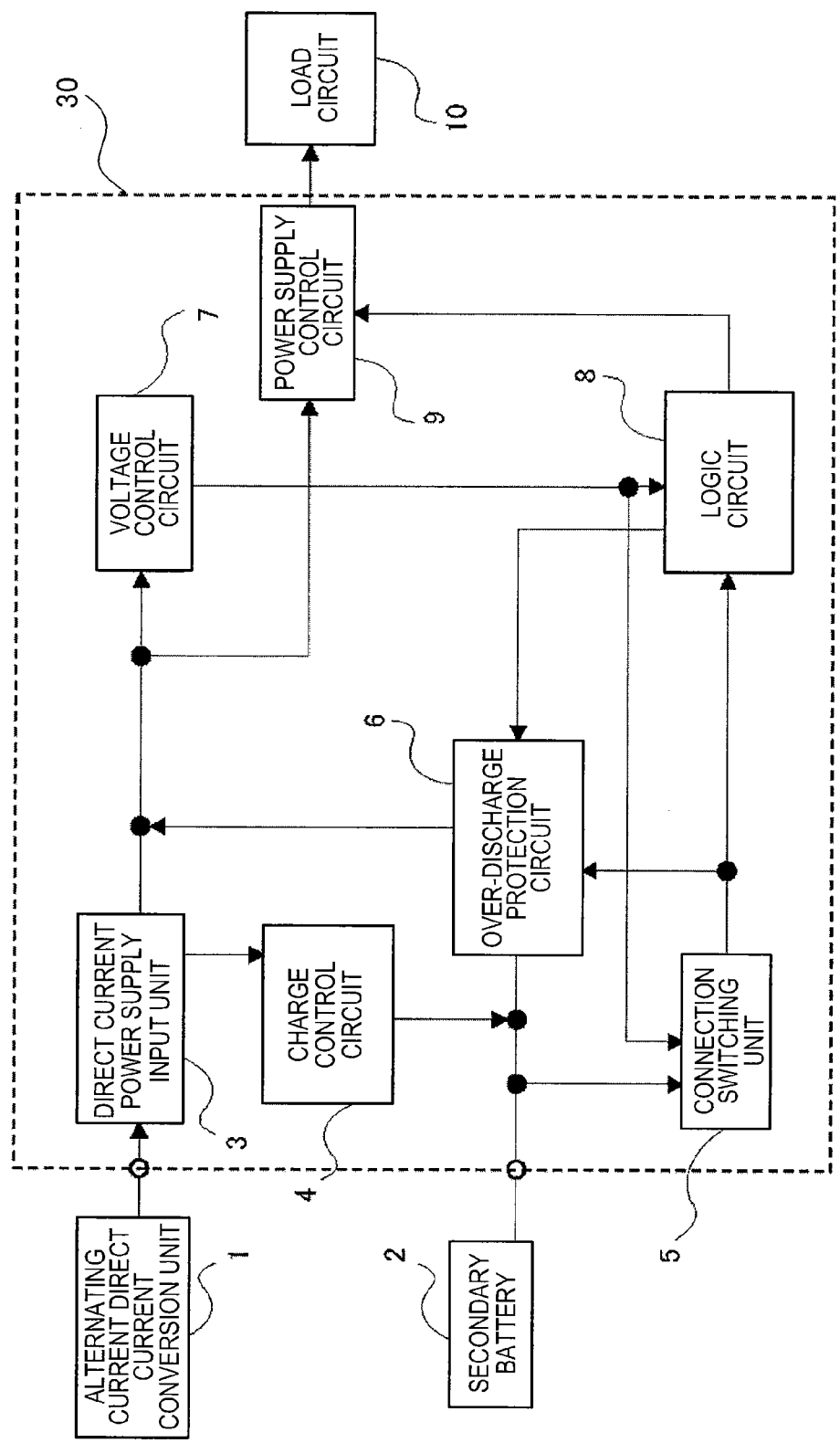
FIG. 1 is a schematic block diagram illustrating a power supply circuit according to the present embodiment.

FIG. 1 is a block diagram of a power supply circuit 30. An alternating current direct current conversion unit 1 is an alternating current/direct current conversion adapter connected to a commercial power source, and outputs a direct current. The output voltage of the alternating current direct current conversion unit 1 is higher than the output voltage of a secondary battery 2.

The power supply circuit 30 using the rechargeable battery includes a direct current power supply input unit 3, a charge control circuit 4, a connection switching unit 5, an over-discharge protection circuit 6, a voltage control circuit 7, a logic circuit 8, and a power supply control circuit 9.

The output of the alternating current direct current conversion unit 1 is provided to the input of the direct current power supply input unit 3. The direct current power supply input unit 3 is configured to output a direct current by suppressing variation of the direct current voltage provided from an external apparatus due to noises. Examples of devices constituting the direct current power supply input unit 3 include an over-current protection device such as a fuse, an overvoltage protection device such as a Zener diode, and a noise suppression device such as a ferrite bead and a capacitor.

The charge control circuit 4 is connected between the output of the direct current power supply input unit 3 and the output of the secondary battery 2. The charge control circuit 4 operates if the secondary battery 2 is charged. The charge control circuit 4 outputs a voltage suitable for the secondary battery 2, and monitors and controls the charge current.

The charge control circuit 4 stops charging if the charge current becomes less than a predetermined value or if a charging time becomes more than a predetermined time. In addition, the charge control circuit 4 performs trickle charging. The trickle charging is a method for charging a battery by passing a very small current. The trickle charging is performed at the start of charging or if the battery becomes close to fully charged state.

The connection switching unit 5 is connected between the output of the secondary battery 2 and the logic circuit 8 explained later. The connection switching unit 5 has a function of a switch that attains two states, i.e., ON state and OFF state, and if physical force is applied, the circuit is connected. If the connection switching unit 5 is a push switch, the circuit is connected only if the switch is pushed.

The over-discharge protection circuit 6 is connected between the output of the direct current power supply input unit 3 and the connection switching unit 5. At the same time, the over-discharge protection circuit 6 is connected between the secondary battery 2 and the logic circuit 8. The over-discharge protection circuit 6 stops the output of the current if the voltage of the secondary battery 2 becomes less than a predetermined value. In addition, the output of the current of the over-discharge protection circuit 6 can also be stopped based on a signal given from the logic circuit 8. If the voltage of the alternating current direct current conversion unit 1 is higher than the output voltage of the secondary battery 2, and the alternating current direct current conversion unit 1 supplies electric power, the direct current power supply input unit 3 supplies electric power to the voltage control circuit 7 and the like explained later even if the over-discharge protection circuit 6 is ready to output electric power.

The voltage control circuit 7 is a constant voltage regulator connected between a connection point between the direct current power supply input unit 3 and the over-discharge protection circuit 6 and a connection point between the logic circuit 8 and the connection switching unit 5. The voltage control circuit 7 stabilizes the voltage output from the direct current power supply input unit 3 or the over-discharge protection circuit 6, and outputs the stabilized voltage to the connection switching unit 5 and the logic circuit 8. The constant voltage regulator is a type of an electric circuit, and is a circuit for controlling an output voltage to be always kept at a constant level.

The voltage control circuit 7 may be a linear regulator or a switching regulator. The output of the voltage control circuit 7 is a power supply for driving the logic circuit 8, and the output voltage is a voltage capable of driving the logic circuit 8. The voltage control circuit 7 outputs a current for the connection switching unit 5 and a current capable of driving the logic circuit 8.

The logic circuit 8 controls the over-discharge protection circuit 6 and the power supply control circuit 9 in accordance with ON state and OFF state of the connection switching unit 5.

The power supply control circuit 9 is a constant voltage regulator, and is connected between the output of the direct current power supply input unit 3 and the over-discharge protection circuit 6 and a load circuit 10 serving as a portable apparatus using the secondary battery. The power supply control circuit 9 stabilizes the voltage output from the direct current power supply input unit 3 or the over-discharge protection circuit 6, and outputs the stabilized voltage to the load circuit 10.

The power supply control circuit 9 can output a voltage and a current capable of driving the load circuit 10. The power supply control circuit 9 may be a linear regulator or a switching regulator. The power supply control circuit 9 can control the output and the stop of the output to the load circuit 10 in accordance with the signal provided from the logic circuit 8.

Figure 2:
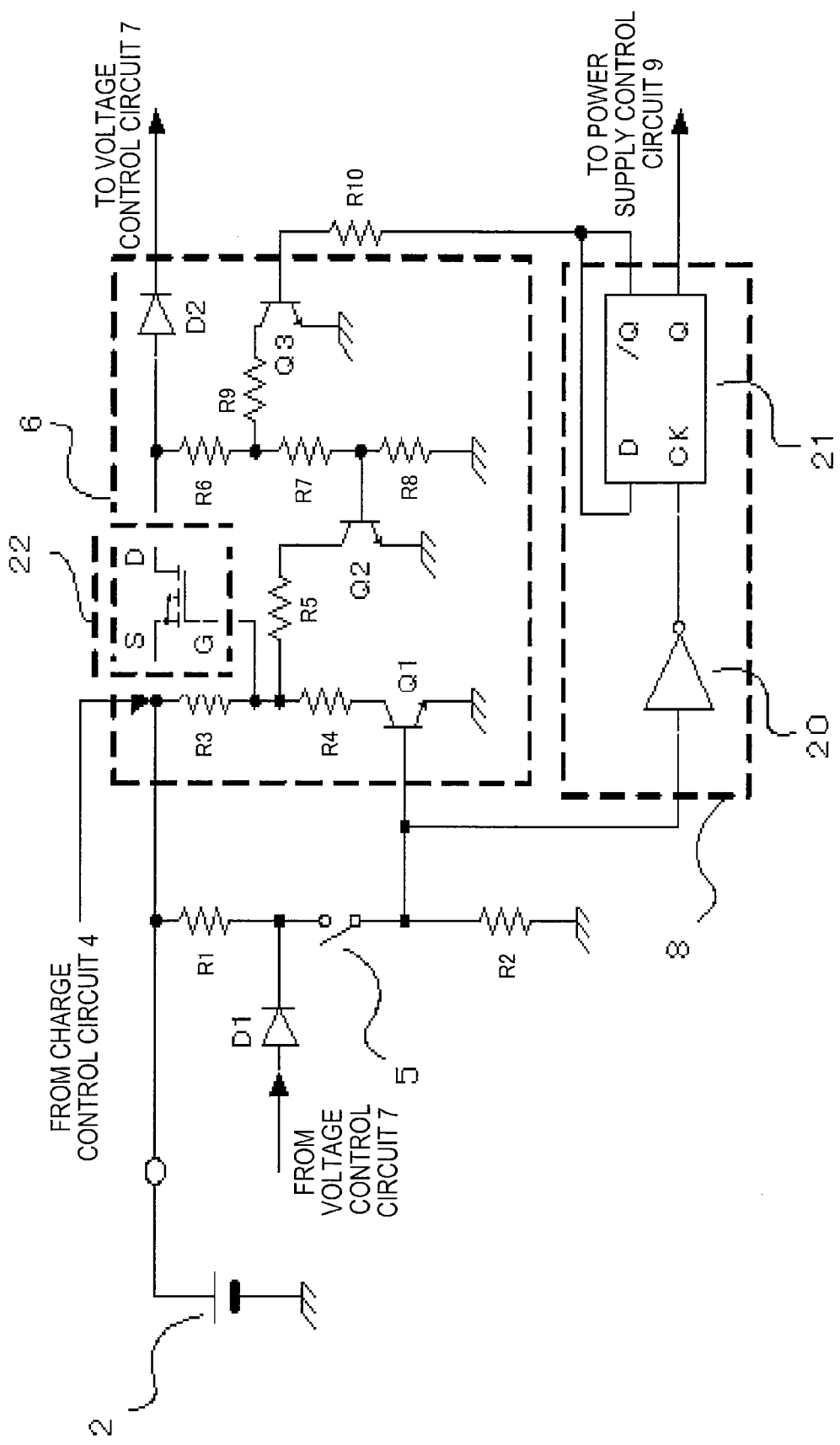
FIG. 2 is a schematic circuit diagram illustrating an example of an over-discharge protection circuit according to the present embodiment.

FIG. 2 shows an example of configuration of the connection switching unit 5, the over-discharge protection circuit 6, and the logic circuit 8 as shown in FIG. 1. However, a line connecting the voltage control circuit 7 and the logic circuit 8 to supply electric power to the logic circuit 8 is not shown in FIG. 2.

The output of the secondary battery 2 as shown in FIG. 1 is grounded via a resistor R1, the connection switching unit 5, and a resistor R2, which are connected in series. The output of the voltage control circuit 7 as shown in FIG. 1 is connected to an anode of a diode D1, and a cathode of the diode D1 is connected to a connection point between the resistor R1 and the connection switching unit 5. If the voltage at the anode is higher than the voltage at the cathode, a current can be passed from the anode to the cathode. If the voltage at the cathode is higher than the voltage at the anode, no current flows through the diode D1.

A connection point between the connection switching unit 5 and the resistor R2 is connected to an input of an inverter 20 constituting the logic circuit 8, and an output of the inverter 20 is input to a terminal CK of a D flip-flop 21 also constituting the logic circuit 8. One of outputs of the D flip-flop 21, i.e., an output Q, is input to the power supply control circuit 9 of FIG. 1. The other of the outputs of the D flip-flop 21, i.e., an output /Q, is input to the over-discharge protection circuit 6 via the resistor R10, and is input to a D terminal of the flip-flop 21.

Hereinafter, the over-discharge protection circuit 6 will be explained in detail. The output of the secondary battery 2 is input to the over-discharge protection circuit 6, and is connected to a source electrode (S) of a MOS-type Field-Effect Transistor (hereinafter referred to as FET) 22. A drain electrode (D) of the FET 22 is connected to the anode of the diode D2, and a cathode of the diode D2 is connected to the voltage control circuit 7 of FIG. 1. The connection point between the secondary battery 2 and the source electrode (S) of the FET 22 is connected to a collector electrode of an NPN transistor Q1 via series resistors R3, R4.

A base electrode of the transistor Q1 is connected to a connection point between the connection switching unit 5 and the inverter 20 of the logic circuit 8, and an emitter electrode of the transistor Q1 is grounded. A gate electrode (G) of the FET 22 is connected to a connection point between the resistor R3 and the resistor R4. The connection point between the resistor R3 and the resistor R4 is connected to a collector electrode of an NPN transistor Q2 via a resistor R5.

A base electrode of the transistor Q2 is connected to a connection point between the drain electrode (D) of the FET 22 and the diode D2 via the series resistors R7, R6, and an emitter electrode of the transistor Q2 is grounded. A base electrode of the transistor Q2 is further grounded via the resistor R8. The connection point between the resistors R6, R7 is connected to a collector electrode of an NPN transistor Q3 via a resistor R9. A base electrode of the transistor Q3 is connected to the other of the outputs of the D flip-flop 21 of the logic circuit 8, i.e., the output /Q, via a resistor R10, and an emitter electrode of the transistor Q3 is grounded.

The circuit operation of the embodiment having the above configuration will be hereinafter explained in two cases. In the first case, the secondary battery 2 is connected. In the second case, the secondary battery 2 is not connected.

<<A. Operation if the Secondary Battery 2 is Connected>>

First, the connection switching unit 5 is in OFF state, i.e., circuit non-connected state. If the connection switching unit 5 is in ON state, i.e., circuit connected state, a current flows in the circuit. Hereinafter, change of the flow of current in the circuit caused by ON/OFF switching of the connection switching unit 5 will be explained. In the present embodiment, if the connection switching unit 5 is repeatedly turned on and off twice, and thereafter the connection switching unit 5 is turned on, the connection switching unit 5 returns back to the initial state in which the connection switching unit 5 is changed from OFF state to ON state. The change of operation will be hereinafter explained in detail.

<A-1: Initial Stage>

In the initial stage, first, if the connection switching unit 5 is in OFF state, no current flows through the resistor R1. The transistors Q1, Q2, Q3 are NPN transistors, and if the base voltage attains a voltage higher than the emitter voltage, a current flows from the collector to the emitter. The base voltage of the transistor Q1 is 0 V, and the emitter voltage thereof is also 0 V. In this state, no current flows through the transistor Q1, and no current flows through the resistor R4.

Since no current flows through the FET 22, the base voltage and the emitter voltage of the transistor Q2 are 0 V. No current flows through the collector of the transistor Q2, and no current flows through the resistor R5. Accordingly, no current flows through the resistor R3.

The FET 22 is a P channel MOS-FET. If a source (S) voltage is higher than a gate (G) voltage, the FET 22 outputs a current to a drain (D), and if the voltages of the source and the gate are the same, the FET 22 does not pass any current. Since no current flows through the resistor R3, the potentials at the source and the gate of the FET 22 are the same, and accordingly, no current flows through the FET 22. Further, the circuit in the later stage does not operate since it does not receive any power supply.

<A-2: Second Stage>

Subsequently, in the second stage, the connection switching unit 5 is turned on. Accordingly, a current flows through the resistor R1 and the resistor R2, and this increases the base voltage of the transistor Q1. Accordingly, a current flows from the collector to the emitter of the transistor Q1, and the voltage divided by the resistor R3 and the resistor R4 becomes the gate voltage of the FET 22. In the FET 22, the gate voltage becomes less than the source voltage, and accordingly, a current is passed to the drain. The current output from the drain passes through the diode D2, and is supplied to the voltage control circuit 7.

If the voltage control circuit 7 receives electric power, the voltage control circuit 7 outputs a predetermined voltage. This output is supplied to the logic circuit 8, which activates the inverter 20 and the D flip-flop 21 as shown in FIG. 2. If the D flip-flop 21 is turned on, the output Q is "L", and the output /Q is "H". Since the output Q is "L", the power supply control circuit 9 does not pass any current to the load circuit 10.

At this occasion, the input of the inverter 20 attains "H", and the output of the inverter 20 attains "L". Accordingly, "L" is input to the terminal CK of the D flip-flop 21.

Figure 3:
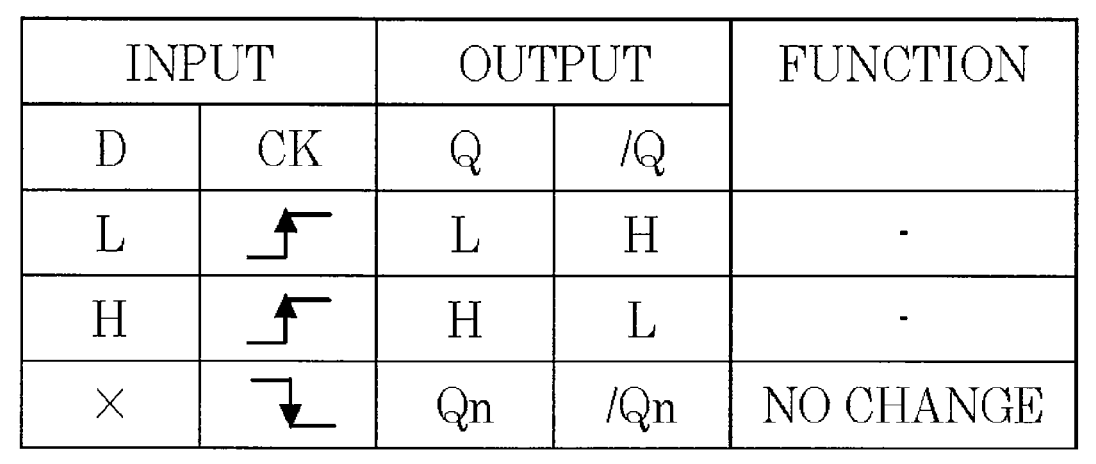

FIG. 3 shows a truth table of the D flip-flop 21. If there is a rise of a signal input to the terminal CK, the D flip-flop 21 reverses the levels of the output Q and the output /Q.

If the output /Q of the D flip-flop 21 is "H", the base voltage of the transistor Q3 is high. Accordingly, a current flows from the collector to the emitter in the transistor Q3, and the current flows from the resistor R6 to the resistor R9. A current also flows through the resistor R7 and the resistor R8, but a resistor value of the resistor R9 is less than a value obtained by adding resistor values of the resistor R7 and the resistor R8. Therefore, the base voltage of the transistor Q2 decreases, and accordingly, the transistor Q2 does not pass any current from the collector to the emitter. Since the current continues to flow through the resistor R3 and the resistor R4, the current also continues to flow from the source to the drain in the FET 22.

<A-3: Third Stage>

Subsequently, in the third stage, a case where the connection switching unit 5 is turned off will be explained. If the connection switching unit 5 is turned off, the base of the transistor Q1 attains 0 V, which causes the transistor Q1 not to pass any current from the collector to the emitter. As a result, no current flows through the resistor R4.

At this occasion, the input to the inverter 20 changes to "L", and the input to the terminal CK of the D flip-flop 21 changes from "L" to "H". At this rise of the signal, the output Q attains "H", and the output /Q attains "L". If the output Q attains "H", the power supply control circuit 9 passes a current to the load circuit 10. Since the output /Q is "L", the transistor Q3 does not pass any current from the collector to the emitter.

If the output /Q of the D flip-flop 21 attains "L", the base voltage of the transistor Q3 decreases, and the current flowing from the collector to the emitter stops. Then, the potential at the connection point between the resistor R7 and the resistor R8 increases, and the current flows through the resistor R5 and flowing through the transistor Q2 from the collector to the emitter.

As soon as the current flowing through the resistor R4 stops, a current flows to the resistor R5. Therefore, a potential difference between the gate and the source of the FET 22 is maintained. Then, the current continues to flow through the FET 22 from the source to the drain, and the current supplied to the load circuit 10 is maintained.

<A-4: Fourth Stage>

Subsequently, in the fourth stage, if the connection switching unit 5 is turned on again, a current flows through the resistor R1 and the resistor R2, the gate voltage of the transistor Q1 increases, which causes a current to flow through the transistor Q1 from the collector to the emitter. The input of the inverter 20 attains "H", and the input to the terminal CK of the D flip-flop 21 attains "L". The output Q and the output /Q do not change. The current keeps on flowing through the FET 22 from the source to the drain, and the current also keeps on flowing from the power supply control circuit 9 to the load circuit 10.

<A-5: Fifth Stage>

Subsequently, in the fifth stage, the connection switching unit 5 is turned off again. Accordingly, the base voltage of the transistor Q1 attains 0 V, and accordingly, the transistor Q1 does not pass any current from the collector to the emitter. The input of the inverter 20 changes to "L". If the input to the terminal CK of the D flip-flop 21 changes from "L" to "H", the output Q attains "L", and the output /Q attains "H".

If the output /Q attains "H", the base voltage of the transistor Q3 increases, which causes the transistor Q3 to pass a current from the collector to the emitter. The voltage at the connection point between the resistor R6 and the resistor R9 decreases, and the voltage at the connection point between the resistor R7 and the resistor R8 also decreases. As a result, the current flowing through the transistor Q2 from the collector to the emitter stops.

Since no current flows through the transistor Q1 and the transistor Q2, no current flows through the resistor R3. This eliminates the potential difference between the source and the gate of the FET, and accordingly, no current flows from the source to the drain. As explained above, the current stops flowing from the secondary battery 2, and the circuit is in the same state as the state in which the connection switching unit 5 is in OFF state in the initial stage.

<A-6: Repetition from Second Stage to Fifth Stage>

If the connection switching unit 5 is turned on again, the circuit is in the same state as the second stage. Accordingly, the states from the second stage to the fifth stage are repeated.

<A-7: Operation of Secondary Battery 2 in Third Stage>

Subsequently, the operation of the secondary battery 2 supplying a current to the load circuit 10 in the third stage will be explained. If the secondary battery 2 is sufficiently charged, the secondary battery 2 discharges a current at a voltage close to the charge voltage. However, as the secondary battery 2 discharges the current, the voltage decreases.

The drain voltage of the FET 22 is about the same potential as the discharge voltage of the secondary battery 2, and if the discharge voltage of the secondary battery 2 decreases, the drain voltage of the FET 22 also decreases.

Since the transistor Q3 is in OFF state, if the drain voltage of the FET 22 is high, the voltage at the connection point between the resistor R7 and the resistor R8 is higher than the base voltage at which the transistor Q2 passes a current from the collector to the emitter. If the discharge voltage of the secondary battery 2 decreases, the voltage at the connection point between the resistor R7 and the resistor R8 decreases. If the discharge voltage of the secondary battery 2 decreases to a voltage at which over-discharge protection is required, the voltage at the connection point between the resistor R7 and the resistor R8 decreases, so that the base voltage of the transistor Q2 decreases, and accordingly, the transistor Q2 does not pass any current from the collector to the emitter.

The transistor Q1 is in a state of passing no current, and the transistor Q2 does not pass any current. Accordingly, no current flows through the resistor R3, and the potential difference between the gate and the source of the FET 22 is eliminated, whereby the FET 22 stops passing the current from the source to the drain. Then, the current stop state from the source to the drain can be maintained.

At this occasion, the pathway in which the current flows from the secondary battery 2 disappears, and therefore, the secondary battery 2 no longer discharges any current. As described above, the over-discharge of the secondary battery 2 can be prevented. This state is maintained until the connection switching unit 5 is turned on again.

<<B. Operation if the Secondary Battery 2 is not Connected>>

Subsequently, operation for supplying power source from only the direct current power supply input unit 3 without connecting the secondary battery 2 will be explained.

<B-1: First Stage>

In the initial stage, the connection switching unit 5 is in OFF state. The output from the direct current power supply input unit 3 is connected to the charge control circuit 4, the voltage control circuit 7, and the power supply control circuit 9. The charge control circuit 4 does not operate since the secondary battery 2 is not connected. The voltage control circuit 7 outputs a current since power source is supplied to the voltage control circuit 7. Power source is supplied to the power supply control circuit 9, but since the signal from the logic circuit 8 is "L", the power supply control circuit 9 does not pass any current to the load circuit 10.

The output of the voltage control circuit 7 supplies a voltage to the connection switching unit 5 via the diode D1, and supplies power source to the logic circuit 8. Since the connection switching unit 5 is in OFF state, no current flows through the resistor R1. The base voltage of the transistor Q1 is 0 V, and accordingly, the transistor Q1 does not pass any current from the collector to the emitter. Since no current flows through the resistor R3, no current flows through the FET 22 from the source to the drain.

The input of the inverter 20 is "L", and the output of the inverter 20 is "H". The D flip-flop 21 is at power-on. The output Q of the D flip-flop 21 is "L", and the output /Q thereof is "H". Since the output Q is "L", the power supply control circuit 9 does not pass any current to the load circuit 10.

<B-2: Second Stage>

Subsequently, in the second stage, the connection switching unit 5 is turned on. Accordingly, a current flows through the resistor R2, which increases the gate voltage of the transistor Q1, and the transistor Q1 passes a current from the collector to the emitter. The potential difference occurs between the gate and the source of the FET 22, and accordingly, a current flows through the FET 22 from the source to the drain, and flows through the resistor R6. However, since the drain voltage of the FET 22 is less than the output voltage of the direct current power supply input unit 3, no current flows through the diode D2.

The input of the inverter 20 attains "H", and the output of the inverter 20 attains "L". In the D flip-flop 21, the input to the terminal CK changes from "H" to "L", and accordingly, be output Q and the output /Q do not change. Since the input of the power supply control circuit 9 does not change from "L", no current is output to the load circuit 10.

<B-3: Third Stage>

Subsequently, in the third stage, the connection switching unit 5 is turned off. In this case, the over-discharge protection circuit 6 operates in the same manner as the operation described as the third stage if the secondary battery 2 is connected. However, since the drain voltage of the FET 22 is less than the output voltage of the direct current power supply input unit 3, no current flows through the diode D2.

The input to the inverter 20 changes to "L", and the input to the terminal CK of the D flip-flop 21 changes from "L" to "H". At this rise of the signal, the output Q attains "H", and the output /Q attains "L". If the output Q attains "H", the power supply control circuit 9 passes a current to the load circuit 10.

<B-4: Fourth Stage>

Subsequently, in the fourth stage, the connection switching unit 5 is turned on again. Accordingly, a current flows through the resistor R2, and the over-discharge protection circuit 6 operates in the same manner as the operation explained in the fourth stage (A-4) if the secondary battery 2 is connected. However, since the drain voltage of the FET 22 is less than the voltage of the direct current power supply input unit 3, no current flows through the diode D2.

The input of the inverter 20 attains "H", and the input to the terminal CK of the D flip-flop 21 attains "L". The outputs Q and /Q do not change, and the power supply control circuit 9 keeps on passing the current to the load circuit 10.

<B-5: Fifth Stage>

Subsequently, in the fifth stage, the connection switching unit 5 is turned off again. Accordingly, the over-discharge protection circuit 6 operates in the same manner as the operation explained in the fifth stage (A-5) if the secondary battery 2 is connected, and the FET 22 does not pass any current from the source to the drain.

The input of the inverter 20 changes to "L". If the input to the terminal CK of the D flip-flop 21 changes from "L" to "H", the output Q attains "L", and the output /Q attains "H". Since the output Q attains "L", the power supply control circuit 9 stops supply of electric current to the load circuit 10, and returns back to the same state as the initial stage.

<B-6: Repetition from Second Stage to Fifth Stage>

If the connection switching unit 5 is turned on again, the circuit attains the state of the second stage, and the state from the second stage to the fifth stage is repeated. Accordingly, even if the power supply is provided by only the direct current power supply input unit 3, the electric power can be supplied to the load circuit 10 in the same manner by manipulating the connection switching unit 5 in the same manner as the case where only the secondary battery 2 is used.

<<C. Power Supply from Direct Current Power Supply Input Unit 3 and the Secondary Battery 2 are Connected at the Same Time>>

If the power supply from the direct current power supply input unit 3 and the secondary battery 2 are connected at the same time, the power supply is always provided to the voltage control circuit 7, and the voltage is applied from the voltage control circuit 7 to the diode D1. However, since the voltage of the second battery 2 is higher than the voltage of the voltage control circuit 7, the current does not flow through the diode D1.

Even in this case, the operation is as follows. If the connection switching unit 5 is turned on and is thereafter turned off, the power supply control circuit 9 passes a current to the load circuit 10. After the connection switching unit 5 is turned on again, and the connection switching unit 5 is turned off, supply of an electric current from the power supply control circuit 9 to the load circuit 10 stops.

If the current is supplied to the load circuit 10, the direct current power supply input unit 3 can charge the secondary battery 2 via the charge control circuit 4.

In the above explanation, the discharge voltage of the secondary battery 2 is higher than the output voltage of the voltage control circuit 7, the anode of the diode D1 is connected to the output of the voltage control circuit 7, and the cathode is connected to the connection switching unit 5. If the secondary battery 2 is used while the discharge voltage of the secondary battery 2 is less than the output voltage of the voltage control circuit 7, the anode of the diode D1 is connected to the connection switching unit 5, and the cathode is connected to the output of the voltage control circuit 7.

In the above explanation, the alternating current direct current conversion unit 1 is the alternating current/direct current conversion adapter connected to the commercial power source. Alternatively, the alternating current direct current conversion unit 1 may be a direct current/direct current conversion adapter connected to a direct current power supply of an automobile and the like, and the external direct current power source may be input to the direct current power supply input unit 3.

<Effects and Modification of the Embodiment>

According to the embodiment explained above, if the voltage of the secondary battery is less than the predetermined value, the secondary battery can be prevented from keeping on discharging the current. Further, the supply of the power source to the load circuit in response to ON/OFF operation of the connection switching unit if only the secondary battery is connected and the supply of the power source to the load circuit in response to ON/OFF operation of the connection switching unit if the power source is supplied from the commercial power source and the like can be performed with the same operation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and sprit of the inventions.

What is claimed is:

1. A power supply circuit using a rechargeable battery comprising:
   an over-discharge protection circuit interposed in a current supply path from a rechargeable battery to a load circuit, wherein the over-discharge protection circuit stops a supply of a current from the rechargeable battery to the load circuit if the voltage of the rechargeable battery becomes less than a predetermined value;
   a connection switching unit connected to the rechargeable battery and connected to an input side of the over-discharge protection circuit, wherein only if the connection switching unit is manipulated, the connection switching unit is in a connected state in which the current is supplied to the over-discharge protection circuit;
   a power supply control circuit connected between the load circuit and an output of the over-discharge protection circuit, wherein the power supply control circuit controls a supply of the current to the load circuit; and
   a logic circuit connected to the connection switching unit, wherein the logic circuit controls the over-discharge protection circuit and the power supply control circuit in accordance with the manipulation of the connection switching unit,
   wherein if the connection switching unit changes to the connected state, the current starts to be supplied from the rechargeable battery to the over-discharge protection circuit, the logic circuit, and the power supply control circuit,
   wherein if the connection switching unit changes to a non-connected state from the connected state, the supply of the current to the over-discharge protection circuit, the logic circuit, and the power supply control circuit is maintained, and the supply of a current to the load circuit is started by supplying the current from the power supply control circuit to the load circuit, and
   wherein if a voltage of the rechargeable battery drops while the current is supplied to the load circuit, the over-discharge protection circuit stops the supply of the current from the rechargeable battery and maintains the stopped state.

2. The power supply circuit using the rechargeable battery according to claim 1 further comprising a direct current power supply input unit that inputs a direct current voltage from an outside, wherein the direct current power supply input unit supplies the current to the load circuit.

3. The power supply circuit using the rechargeable battery according to claim 2 further comprising a charge control circuit connected to the output of the rechargeable battery and the direct current power supply input unit, wherein the charge control circuit controls charging of the rechargeable battery.

4. The power supply circuit using the rechargeable battery according to claim 1 further comprising a voltage control circuit connected to the output of the over-discharge protection circuit, wherein the output of the voltage control circuit is input to the over-discharge protection circuit and the logic circuit via the connection switching unit.

5. The power supply circuit using the rechargeable battery according to claim 2 further comprising a voltage control circuit connected to the direct current power supply input unit and the output of the over-discharge protection circuit, wherein the output of the voltage control circuit is input to the over-discharge protection circuit and the logic circuit via the connection switching unit.

6. The power supply circuit using the rechargeable battery according to claim 1, wherein the over-discharge protection circuit includes a P channel MOS-FET connected to the rechargeable battery, and the connection switching unit controls a gate voltage of the MOS-FET to control the output of the over-discharge protection circuit.

7. The power supply circuit using the rechargeable battery according to claim 1, wherein if the connection switching unit is changed to the circuit connected state by an initial manipulation, the current supplied from the rechargeable battery is allowed by the over-discharge protection circuit with the logic circuit, and even if the connection switching unit is changed to the circuit non-connected state, the current is continued to be supplied from the rechargeable battery by the over-discharge protection circuit with the logic circuit, even if the connection switching unit is changed to the circuit connected state in a subsequent manipulation, the current is further continued to be supplied from the rechargeable battery by the over-discharge protection circuit with the logic circuit, and if the connection switching unit is changed to the circuit non-connected state, the current supplied from the rechargeable battery is stopped by the over-discharge protection circuit with the logic circuit.

8. A power supply circuit using a rechargeable battery comprising:

an over-discharge protection circuit interposed in a current supply path from a rechargeable battery to a load circuit;

a connection switching unit connected to the rechargeable battery and connected to an input side of the over-discharge protection circuit, wherein only if the connection switching unit is manipulated, the connection switching unit is in a connected state in which the current is input to the over-discharge protection circuit;

a power supply control circuit connected between the load circuit and an output of the over-discharge protection circuit, wherein the power supply control circuit controls a supply of the current to the load circuit; and a logic circuit connected to the connection switching unit, wherein the logic circuit controls the over-discharge protection circuit and the power supply control circuit in accordance with the manipulation performed on the connection switching unit, wherein if the connection switching unit changes to the connected state, the over-discharge protection circuit starts supplying a current from the rechargeable battery to the power supply control circuit, wherein if the connection switching unit changes to a non-connected state from the connected state, the supply of a current to the load circuit is started by supplying the current from the power supply control circuit to the load circuit, and wherein if a voltage of the rechargeable battery drops to be less than a predetermined value while the current is supplied to the load circuit, the supply of the current from the rechargeable battery is stopped.

9. The power supply circuit using the rechargeable battery according to claim 8, wherein if the connection switching unit is changed to the connected state by an initial manipulation, the current supplied from the rechargeable battery is allowed by the over-discharge protection circuit with the logic circuit, and even if the connection switching unit is changed to the non-connected state, the current is continued to be supplied from the rechargeable battery by the over-discharge protection circuit with the logic circuit, even if the connection switching unit is changed to the connected state in a subsequent manipulation, the current is further continued to be supplied from the rechargeable battery by the over-discharge protection circuit with the logic circuit, and if the connection switching unit is changed to the non-connected state, the current supplied from the rechargeable battery is stopped by the over-discharge protection circuit with the logic circuit.

10. The power supply circuit using the rechargeable battery according to claim 9 further comprising a direct current power supply input unit that inputs a direct current voltage from an outside, wherein the direct current power supply input unit supplies the current to the load circuit.

11. The power supply circuit using the rechargeable battery according to claim 10 further comprising a charge control circuit connected to the output of the rechargeable battery and the direct current power supply input unit, wherein the charge control circuit controls charging of the rechargeable battery.

12. The power supply circuit using the rechargeable battery according to claim 11 further comprising a voltage control circuit connected to the output of the over-discharge protection circuit, wherein the output of the voltage control circuit is input to the over-discharge protection circuit and the logic circuit via the connection switching unit.

13. The power supply circuit using the rechargeable battery according to claim 12 further comprising a voltage control circuit connected to the direct current power supply input unit and the output of the over-discharge protection circuit, wherein the output of the voltage control circuit is input to the over-discharge protection circuit and the logic circuit via the connection switching unit.

14. The power supply circuit using the rechargeable battery according to claim 13, wherein the over-discharge protection circuit includes a P channel MOS-FET connected to the rechargeable battery, and the connection switching unit controls a gate voltage of the MOS-FET to control the output of the over-discharge protection circuit.

* * * * *